Figure 1:
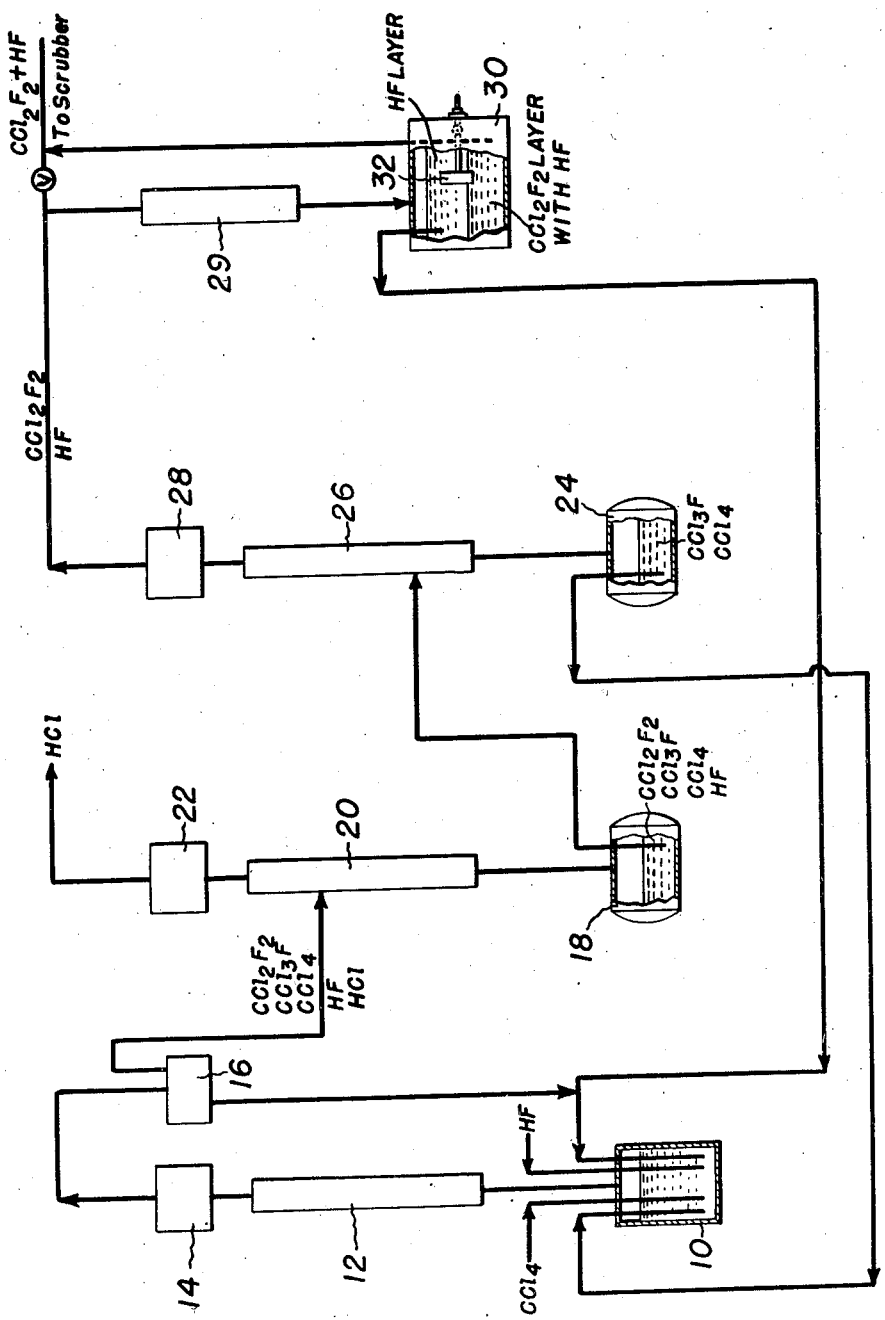

Oct. 5, 1948.  A. F. BENNING  2,450,415
DISTILLATION PROCESS FOR SEPARATING PRODUCTS
OF CARBON TETRACHLORIDE FLUORINATION
Filed Nov. 19, 1946  3 Sheets-Sheet 1

INVENTOR.
ANTHONY F. BENNING
BY
Edwin C. Woodhouse
ATTORNEY

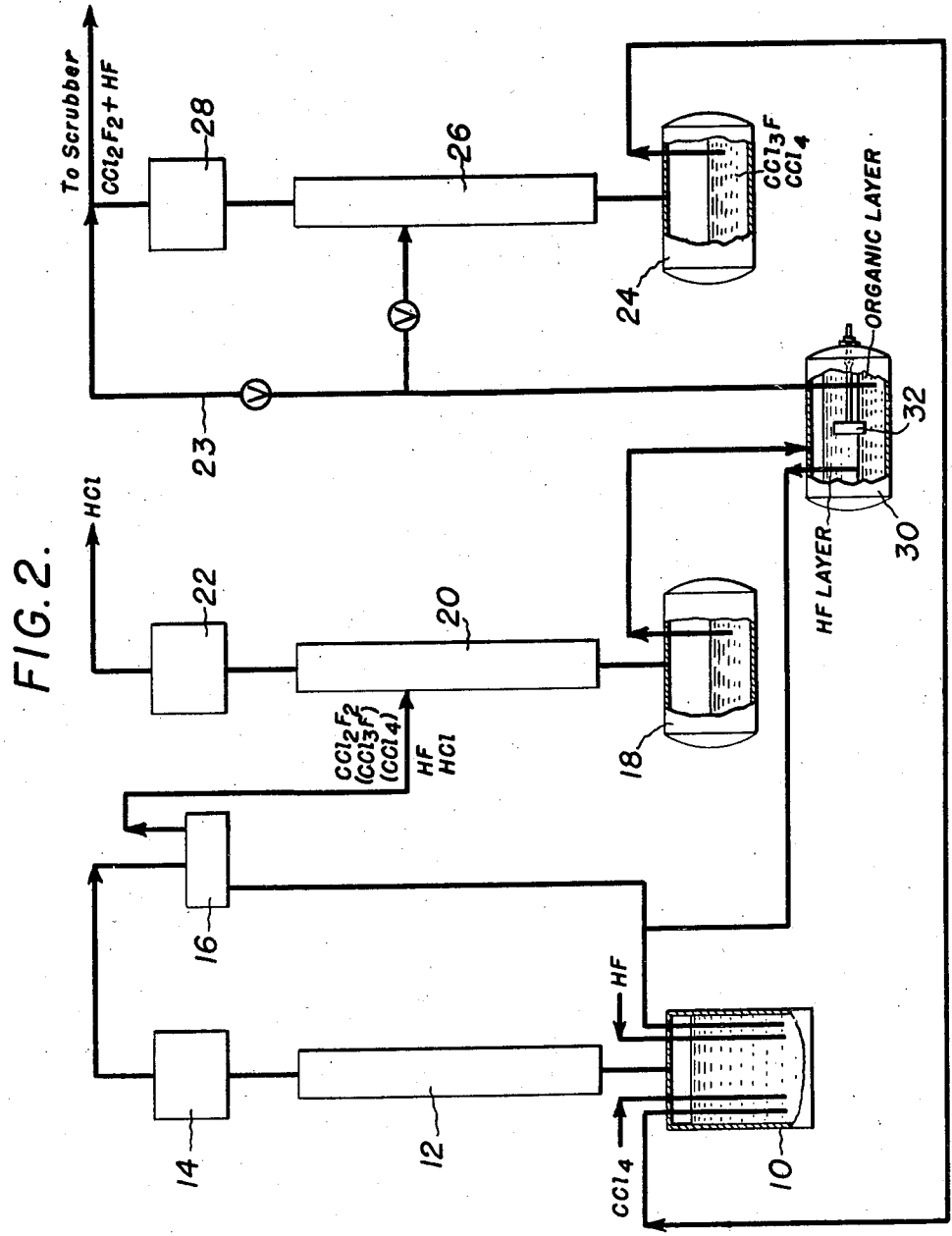

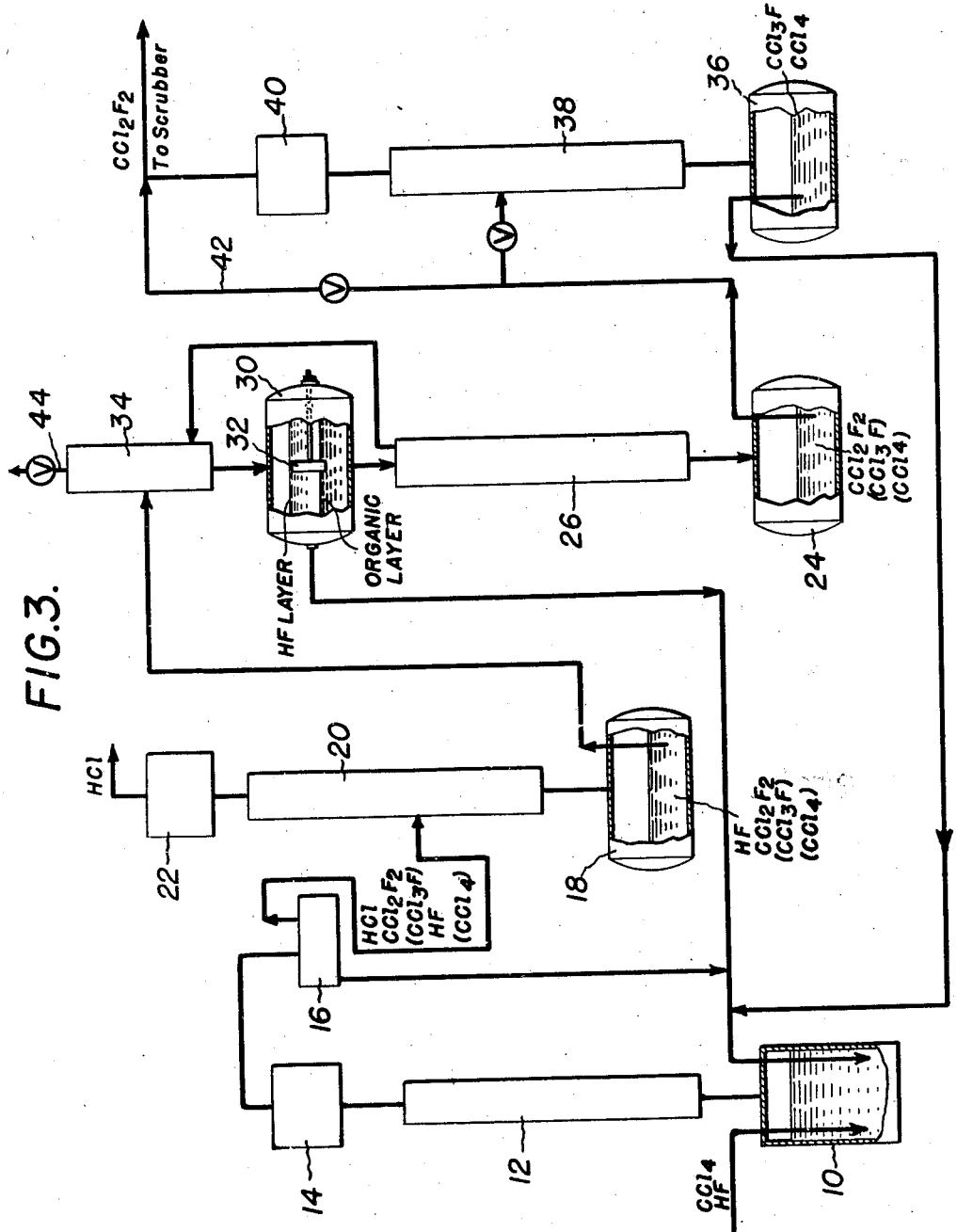

Patented Oct. 5, 1948

2,450,415

UNITED STATES PATENT OFFICE 2,450,415

DISTILLATION PROCESS FOR SEPARATING PRODUCTS OF CARBON TETRACHLORIDE FLUORINATION

Anthony F. Benning, Woodstown, N. J., assignor to Kinetic Chemicals, Inc., Wilmington, Del., a corporation of Delaware Application November 19, 1946, Serial No. 710,890

9 Claims. (Cl. 202—51)

This invention relates to a process for separating valuable components from the reaction mixture obtained in the fluorination of carbon tetrachloride.

In the fluorination of carbon tetrachloride in the presence of an antimony catalyst as it has been carried out heretofore, there is produced a reaction mixture comprising mainly HCl, $CCl_2F_2$ and $CCl_3F$ with small proportions of HF and usually with small amounts of unreacted $CCl_4$. The separation of the valuable components of such mixture has been attended with considerable difficulty. The usual procedure has been to wash the reaction mixture with water and sodium hydroxide solution to remove the acidic components, drying and condensing the washed products and then subjecting to fractional distillation to remove the dichlorodifluoromethane. During the reaction, only about 50% to 75% of the $CCl_4$ is converted to $CCl_2F_2$ so that the reaction mixture contains about 58 mole per cent of HCl, about 21 mole per cent of $CCl_2F_2$, about 16 mole per cent of $CCl_3F$ and smaller amounts of HF and $CCl_4$. This requires the use of large size equipment to wash, dry and condense the large amounts of $CCl_3F$ and other organic products in the reaction mixture. Also, substantial amounts of valuable organic products are lost by solution in the wash water. This procedure further involves the loss of valuable HCl in the form of an aqueous solution contaminated with HF and organic products. Furthermore, when it was attempted to fractionally distill the reaction mixture, it was found that the distillation characteristics of the various components varied so much and were so inconsistent that, prior to my invention, it was not possible to carry out an efficient and economical separation.

It is an object of the present invention to provide a process for recovering the valuable components from a reaction mixture obtained by fluorinating carbon tetrachloride. Another object is to provide a process for separating dichlorodifluoromethane from the reaction mixture obtained by fluorinating $CCl_4$. A further object is to provide a process for recovering HCl in a usable form from the reaction mixture obtained by fluorinating $CCl_4$. Other objects are to advance the art. Still other objects will appear hereinafter.

Some of the above and other objects of my invention may be accomplished by subjecting a reaction mixture, comprising mainly HCl, $CCl_2F_2$ and $CCl_3F$ and small proportions of HF, to anhydrous fractional distillation under pressures of from about 40 to about 200 pounds per square inch gauge and at temperatures of from about $-63°$ C. to about $-20°$ C. adjusted to the pressures to distill off substantially pure anhydrous HCl while retaining the rest of the mixture in the still. The mixture remaining in the still may then be subjected to a further anhydrous fractional distillation under pressures of from about 0 to about 100 pounds per square inch gauge and at temperatures of from about $-36°$ C. to about $+32°$ C., adjusted to the pressures to distill off $CCl_2F_2$ and HF from the rest of the mixture. The mixture of $CCl_2F_2$ and HF is then condensed and caused to settle until it forms a layer of substantially pure $CCl_2F_2$ containing a small proportion of dissolved HF and a layer of substantially anhydrous HF containing a minor proportion of dissolved $CCl_2F_2$, which layers are separated. The separated $CCl_2F_2$ may then be passed to a scrubber where it is washed with water and with aqueous sodium hydroxide solution to remove HF. The undistilled portion of the reaction mixture, comprising $CCl_3F$ and unreacted $CCl_4$, and the separated HF may then be recycled for further reaction.

Other objects of my invention may be accomplished by effecting the layer separation immediately following the HCl distillation, that is, by subjecting the still residue from the HCl distillation to a layer separation. This may be coupled with operation of the reflux column above the reaction vessel so that no or not more than traces of $CCl_3F$ and $CCl_4$ appear in the reaction mixture passing to the HCl distillation unit.

I have found that, by my process, I am able to effectively separate the reaction mixture into its valuable components in an easy and economical manner and to largely overcome the objections of the method previously employed. Only relatively small amounts of material are subjected to the washing, drying and condensing steps, whereby large economies are effected in the process and in the apparatus employed. Furthermore, the HCl is recovered in a commercially valuable and usable form. There is also substantially complete recovery of organic reactants and products, since none is lost by solution in the scrubbing water. Furthermore, a large saving of HF is obtained by separation and recycling of the HF layer, the $CCl_2F_2$ dissolved therein being unobjectionable since it will not be further fluorinated and will return in the reaction mixture. It will thus be apparent that, by my process, I am able to effectively recover the valuable components of the reaction mixture in a simple and easy manner and to effect large economies in the process and in the apparatus.

In order to more clearly illustrate my invention and the best modes of carrying the same into effect, my invention will be described in more detail with reference to the accompanying drawings which illustrate preferred forms of apparatus, shown somewhat diagrammatically, which may be employed for carrying out my invention.

The apparatus shown in Fig. 1 of the drawings comprises a reaction vessel 10, a reflux column 12, a dephlegmator 14, a catch tank 16, a reflux column 20 and a dephlegmator 22, all connected in series by suitable conduits. A still pot 18 is connected to the bottom of the reflux column 20. There is also provided a reflux column 26, a dephlegmator 28 and a still pot 24 connected by suitable conduits. A conduit leads from the still pot 18 to the reflux column 26. The dephlegmator 28 is connected to a condenser 29 and a settling tank 30 through suitable conduits. The still pot 24 is provided with a conduit for withdrawing still residues therefrom and recycling them to the reaction vessel 10. The settling tank 30 is provided with a member 32 for indicating the level of the interface between the two layers. A conduit is provided for withdrawing the HF layer from the settling tank 30 and recycling it to the reaction vessel 10. Another conduit is provided for withdrawing the $CCl_2F_2$ layer from the tank 30 and conducting it to a scrubber, not shown.

In operation, $CCl_4$ and HF are passed to the reaction vessel 10, containing a fluorination catalyst, wherein the $CCl_4$ is fluorinated to produce $CCl_2F_2$ and other products. A suitable catalyst may be prepared by placing about 400 parts of $SbCl_5$ and about 40 parts of $SbCl_3$ in the reaction vessel and then passing HF through the mixture until the fluorine content therein is about 1% to about 7%. The reaction mixture is passed from the reaction vessel through the reflux column 12 and dephlegmator 14, operated to retain $CCl_4$ and $CCl_3F$ for maximum conversion to $CCl_2F_2$. The reaction products then pass to the catch tank 16 wherein they are freed from entrained catalyst, such as antimony salts, which is returned to reaction vessel 10. The gaseous reaction mixture is compressed into the middle of the reflux column 20, employing a pump or compressor where necessary. The mixture entering the reflux column 20 is gaseous or partially liquid and partially gaseous depending upon the temperature and pressure.

The reflux column 20 and the dephlegmator 22 are operated at temperatures, corresponding to the pressure employed, to distill off substantially pure anhydrous HCl which is taken off at the top. With pressures of about 100 pounds per square inch gauge, the dephlegmator temperature will be from about −40° C. to about −50° C. I have found these last temperatures and pressures to be the most practical, but higher or lower pressures may be used with the temperatures adjusted accordingly. The still pot 18 will be heated to give a pot temperature of about 25° C. to about 30° C. but may be as high as 50° C. when large amounts of $CCl_3F$ are present.

The other components of the reaction mixture will pass to and be collected in the still pot 18. The residue in the still pot will be forced, by autogenous pressure, into the reflux column 26. There will be a slight pressure drop so that the reflux column 26 will normally operate at slightly lower pressures than the reflux column 20, e. g., at from about 35 to about 70 pounds per square inch gauge. If desired, a compressor or other means can be included to increase the pressure in the reflux column 26, but this will generally be unnecessary. Preferably, the pressure in the reflux column 26 and the dephlegmator 28 will be about 40 pounds per square inch gauge. At the preferred pressure, the temperature in the dephlegmator will be from about 0° C. to about 5° C. By this means, there is obtained a substantially complete separation of the $CCl_2F_2$ and HF from the rest of the reaction mixture.

The mixture of $CCl_2F_2$ and HF from the dephlegmator 28 may be passed directly to a scrubber wherein the HF can be removed from the $CCl_2F_2$ by washing with water and sodium hydroxide solution. Preferably, however, the mixture of $CCl_2F_2$ and HF will be condensed and passed to the settling tank 30. Upon settling, there is formed a layer of substantially anhydrous HF containing a minor proportion of dissolved $CCl_2F_2$ and a layer of substantially pure $CCl_2F_2$ containing a small proportion of dissolved HF. The amount of dissolved $CCl_2F_2$ in the HF layer will vary with the temperature, being about 15% by weight at −30° C. and about 25% by weight at +20° C. The amount of HF dissolved in the $CCl_2F_2$ layer will also be dependent upon the temperature, varying from about 0.4% by weight at −30° C. to about 0.9% at +20° C. Usually, the layer separation will be carried out at temperatures which will develop sufficient pressure to force the $CCl_2F_2$ layer to the scrubbers by autogenous pressure. With the scrubbers operating at from about 0 to about 5 pound per square inch gauge, the temperature of the layer separation will be from about −20° C. to about 0° C. Higher pressures in the scrubbers will require higher temperatures in the separator. If it is desired to carry out the layer separation at lower temperatures so as to reduce the amount of dissolved substances in the layers, pumps may be used to force the layers to those parts of the system operating at higher pressures.

The $CCl_2F_2$ layer will be withdrawn from tank 30 and passed to a scrubber to be washed free of HF by washing with water and aqueous sodium hydroxide solution. The HF layer is withdrawn and passed to the reaction vessel 10 or to storage. The residue, in the still pot 24, comprises $CCl_3F$ and unreacted $CCl_4$ which, preferably, will be returned to the reaction vessel 10 for further fluorination.

The residues in the still pots 18 and 24 will preferably be allowed to build up until the pots are about half full and the residues will be drawn off therefrom as necessary to maintain the pots about half full. If all of the still residue were removed from each pot, the stills would tend to operate erratically. By maintaining each still pot about half full of residue, smoother and better still performance is obtained.

The layer separation of the HF can be effected at other points in the system. For example, the still residue from still pot 18 may be passed to a settling tank and settled to form an HF layer and an organic layer which can be separated.

One example of this modification is illustrated in Fig. 2 of the drawings wherein the settling tank 30 is placed between the still pot 18 and the reflux column 26 and the condenser 29 is eliminated. The HF layer will contain a minor proportion of dissolved organic products, mainly $CCl_2F_2$ and $CCl_3F$, the amounts depending on the temperature. The $CCl_2F_2$ is soluble in HF in the proportion of about 15% by weight at −30° C. and about 25% by weight at +20° C. The $CCl_3F$ is soluble in HF in the proportion of about 6% by weight at −30° C. and about 9% by weight at +20° C. The total amount of organic products dissolved in the HF layer will be between about 6% by weight at −30° C. and about 25% by weight at +20° C., depending on the relative proportions of $CCl_3F$ to $CCl_2F_2$. The organic layer will also contain a small proportion of dissolved HF, the amount of which will vary with temperature and the ratio of $CCl_3F$ to $CCl_2F_2$ in the layer. HF is soluble in $CCl_2F_2$ in an amount of about 0.4% by weight at −30° C. and about 0.9% by weight at +20° C. HF is soluble in $CCl_3F$ to the extent of about 0.2% by weight at −30° C. and about 0.3% by weight at +20° C. The amount of HF, dissolved in the organic layer, will vary from about 0.2% to about 0.9% by weight at temperatures from −30° C. to +20° C.

As in the case of the modification of Fig. 1, the temperature of the layer separation in Fig. 2 will usually be such as to develop sufficient pressure to force the organic layer to the next stage of the system, that is to column 26. When column 26 is operated at 0 pounds per square inch gauge, the temperature of the layer separation will be from about −20° C. to about 0° C. When column 26 is operated at 100 pounds per square inch gauge, the temperature in the separator will be from about +25° C. to about +45° C. If it is desired to carry out the layer separation at lower temperatures, then pumps will be used to force the layers to the desired parts of the system operating at higher pressures.

After the layer separation, the HF layer will be recycled to the reaction vessel 10 or passed to storage and the organic layer will be passed to reflux column 26. The column 26 is provided for the fractional distillation of $CCl_2F_2$ and HF from the rest of the organic products. Column 26 and dephlegmator 28 will be operated as in Fig. 1, that is at pressures of from about 0 to about 100 pounds per square inch gauge and temperatures of from about −36° C. to about +32° C. and preferably at about 40 pounds per square inch gauge and from about 0° C. to about 5° C. The mixture of $CCl_2F_2$ and HF from the dephlegmator 28 will be passed to scrubbers for washing with water and aqueous sodium hydroxide solution to remove the HF therefrom. The organic products from still pot 28 will be recycled to the reaction vessel 10 for further fluorination.

By improving the efficiency of reflux column 12 as by converting it to an effective fractionating column, it is possible to eliminate substantially all of the $CCl_3F$ and $CCl_4$ so that the reaction mixture leaving the dephlegmator 14 comprises about 64 mole per cent HCl, about 32 mole per cent $CCl_2F_2$, about 4 mole per cent HF and contains no more than traces of under fluorinated compounds. This modification is also shown in Fig. 2, the parentheses about the $CCl_3F$ and $CCl_4$ indicating the substantial absence of such compounds from the reaction mixture. Under such circumstances, the catch tank 16 becomes unnecessary as all catalyst is also removed from the effluent gases in the column 12. Also, under such conditions, the organic layer in the separator 30 will consist essentially of $CCl_2F_2$ containing dissolved HF which will be passed directly to the scrubbers as by by-pass line 23 of Fig. 2 thereby eliminating pot 24, column 26 and dephlegmator 28. In this modification, the separator 30 will be operated under the conditions set forth for that in Fig. 1.

Still further and preferred modifications are shown in Fig. 3 of the drawings wherein the residue from the still pot 18 is passed to a condenser 34 for cooling to the temperature desired for the layer separation. The condenser is provided with a vent 44 for venting off air or other gaseous inert material which may be accidentally introduced into the system. The liquid products drain into the settling tank 30 from the condenser 34. The HF layer containing dissolved organic products is drawn from the settling tank and recycled to the reactor 10 or passed to storage. The organic layer containing dissolved HF passes from the settling tank 30 into the reflux column 26. The column 26 is operated at temperatures and pressures corresponding to those in Figs. 1 and 2 to distill off a mixture of $CCl_2F_2$ and HF which passes to condenser 34 where it is condensed and then passes to settling tank 30. The undistilled portion of the organic products in column 26 passes to the still pot 24 from which it is passed to reflux column 38 or to the scrubbers, depending upon the amount of $CCl_3F$ in the reaction mixture. Where the reaction mixture, entering column 20, contains substantial amounts of $CCl_3F$, with or without $CCl_4$, the column 38 is used to distill off $CCl_2F_2$ through dephlegmator 40 and then to the scrubbers, the $CCl_3F$ and any $CCl_4$ passing to still pot 36 and then to reactor 10. When column 12 is so operated that the mixture entering column 20 contains substantially no $CCl_3F$ or $CCl_4$, the residue in still pot 24 is substantially pure $CCl_2F_2$ which is passed directly to the scrubbers, as through by-pass line 42, eliminating column 38, dephlegmator 40 and still pot 36.

Preferably, the layer separation in tank 30 will be operated at the equilibrium temperatures so that the organic layer will drain into column 26 by gravity. With column 26 operating at 40 to 90 pounds per square inch gauge, the equilibrium temperature in tank 30 will be from 0° C. to 30° C. The preferred pressures and temperatures will be about 70 pounds per square inch gauge in column 26 and about 15° C. to about 21° C. in tank 30.

The process of Fig. 3 has the advantage that the $CCl_2F_2$, going to the scrubbers, is substantially free of HF so that essentially no HF is lost in the scrubbing liquor but practically all of the HF accumulates in the HF layer withdrawn from tank 30. I have found that HF and $CCl_2F_2$ form a pseudo azeotrope in which the ratio of HF to $CCl_2F_2$ is materially greater than the solubility of HF in the organic layer and which azeotrope boils about 6° C. below the boiling point of pure $CCl_2F_2$. At 20° C., the equilibrium composition of such pseudo azeotrope vapor is about 8% by weight of HF and about 92% by weight of $CCl_2F_2$. This compares with the solubility of HF in $CCl_2F_2$ of about 0.9% by weight at 20° C. Therefore, by adjusting the temperature in column 26 to a temperature at or above the boiling point of the pseudo azeotrope but below the boiling point of pure $CCl_2F_2$ or of the mixture of $CCl_2F_2$ and $CCl_3F$, the vapors, passing from column 26 to condenser 34, will contain a materially higher ratio of HF to organic products than that in the organic layer passing to column 26 from tank 30. Thus, the HF is continuously stripped from the organic products in column 26 and the organic products in still pot 24 will contain not more than traces of HF.

Commercial HF frequently contains small amounts of $SO_2$ (average is about 0.6% by weight) and moisture. The moisture is converted into $COCl_2$ by reaction with $CCl_4$ in reaction vessel 10. The $SO_2$ and $COCl_2$ appear in the gaseous reaction mixture passing to reflux column 20. In the systems of Figs. 1 and 2, the $SO_2$ and $COCl_2$ do not present a serious problem since they pass out of the system with the $CCl_2F_2$ and are removed therefrom by the scrubbing liquors.

In the system of Fig. 3, there is a tendency for the $COCl_2$ to build up to a limited extent in the reflux circuit represented by column 26, condenser 34 and settling tank 30. After the $COCl_2$ has built up to a certain extent in such circuit, any additional amounts will be discharged with the $CCl_2F_2$ through pot 24. Some of the $COCl_2$ will pass out of settling tank 30 with the HF layer. The building up of the $COCl_2$ in the system can be materially reduced by removing the $COCl_2$ from the HF layer by any suitable means before returning such layer to reaction vessel 10. This may be done conveniently by fractional distillation, the $COCl_2$ forming a constant boiling mixture with HF which, at 25 pounds per square inch gauge, contains about 77% by weight of $COCl_2$ and 23% by weight of HF and boils at about 21° C.

The presence of $SO_2$ in the reaction mixture, presents a more serious problem in the system of Fig. 3. It forms a ternary mixture of the approximate composition: 84% by weight of $CCl_2F_2$, 12% by weight of $SO_2$ and 3.5% by weight of HF. This mixture boils at +4° C. under a pressure of 44 pounds per square inch gauge and at −36° C. at 1 atmosphere. Accordingly, the $SO_2$ is stripped from the organic products in column 26 and tends to accumulate in the reflux circuit comprising column 26, condenser 34 and tank 30. The $SO_2$ passes out of tank 30 with the HF layer faster than it is introduced into the system with fresh commercial HF. However, if the HF layer is recyled to reaction vessel 10 without purification, the $SO_2$ therein is retained in the system, passing through the reaction vessel 10 and reappearing in the reaction mixture. The building up of $SO_2$ in the system to an objectionable extent can be prevented by removing the $SO_2$ from the separated HF layer by any suitable means before introducing such HF layer into reaction vessel 10. A convenient method is to subject the separated HF layer to fractional distillation, either continuously or periodically, to distill off the ternary mixture. I have used, for this purpose, a reflux column, dephlegmator and still pot such as 26, 28 and 24, respectively, as in Figs. 1 and 2, with pressures of from about 30 to about 90 pounds per square inch gauge in the reflux column and temperatures of from about −5° C. to about +25° C. in the dephlegmator. Preferred conditions are about 70 pounds per square inch gauge and +15° C., the temperatures in the still pot being about 75° C. to about 85° C.

The apparatus and the operation thereof, as above described, illustrates one type of apparatus for a continuous process. Other types of apparatus may be substituted therefor. Also, the process may be operated batchwise in suitable apparatus therefor. Furthermore, pressures, higher and lower than those disclosed, may be employed with suitable adjustment of the temperatures in accordance with the principles of my invention. Therefore, my invention is not to be limited to the specific embodiments disclosed, but I intend to cover my invention broadly as in the appended claims.

This is a continuation-in-part of my copending application Serial No. 577,868, filed February 14, 1946, now abandoned.

I claim:

1. The process of separating valuable components from a reaction mixture comprising HCl, HF, $CCl_2F_2$ and $CCl_3F$, of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then subjecting the remaining mixture to a further anhydrous fractional distillation under pressures of from about 0 to about 100 pounds per square inch gauge and at temperatures of from about −36° C. to about +32° C., adjusted to the pressures to distill off a mixture comprising substantially the dichlorodifluoromethane and the hydrogen fluoride, condensing the distilled mixture, settling the condensed mixture until it forms a layer of substantially anhydrous hydrogen fluoride containing a minor proportion of dissolved dichlorodifluoromethane and a layer of dichlorodifluoromethane containing a small proportion of dissolved HF, and then separating the layers.

2. The process of separating valuable components from a reaction mixture comprising HCl, HF, $CCl_2F_2$ and $CCl_3F$, of the character of that obtained by the reaction of HF on $CCl_4$, which comprises the steps of subjecting the reaction mixture to anhydrous fractional distillation under pressures of about 100 pounds per square inch gauge and at about −50° C. to about −40° C. to distill off the HCl as substantially pure anhydrous hydrogen chloride, then subjecting the remaining mixture to a further anhydrous fractional distillation under pressures of about 40 pounds per square inch gauge and at from about 0° C. to about 5° C. to distill off a mixture comprising substantially the dichlorodifluoromethane and the hydrogen fluoride, condensing the distilled mixture, settling the condensed mixture until it forms a layer of substantially anhydrous hydrogen fluoride containing a minor proportion of dissolved dichlorodifluoromethane and a layer of dichlorodifluoromethane containing a small proportion of dissolved HF, and then separating the layers.

3. The process of separating valuable components from a reaction mixture comprising HCl, HF, $CCl_2F_2$, $CCl_3F$ and $CCl_4$, of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then subjecting the remaining mixture to a further anhydrous fractional distillation under pressures of from about 0 to about 100 pounds per square inch gauge and at temperatures of from about −36° C. to about +32° C., adjusted to the pressures to distill off a mixture comprising substantially the dichlorodifluoromethane and the hydrogen fluoride, condensing the distilled mixture, settling the condensed mixture until it forms a layer of substantially anhydrous hydrogen fluoride containing a minor proportion of dissolved dichlorodifluoromethane and a layer of dichlorodifluoromethane containing a small proportion of dissolved HF, separating the layers, and washing the separated dichlorodifluoromethane layer to remove the HF therefrom.

4. The process of separating valuable components from a reaction mixture comprising HCl, HF, $CCl_2F_2$, $CCl_3F$ and $CCl_4$, of the character of that obtained by the reaction of HF on $CCl_4$, which comprises the steps of subjecting the reaction mixture to anhydrous fractional distillation under pressures of about 100 pounds per square inch gauge and at about −50° C. to about −40° C. to distill off the HCl as substantially pure anhydrous hydrogen chloride, then subjecting the remaining mixture to a further anhydrous fractional distillation under pressures of about 40 pounds per square inch gauge and at from about 0° C. to about 5° C. to distill off a mixture comprising substantially the dichlorodifluoromethane and the hydrogen fluoride, condensing the distilled mixture, settling the condensed mixture until it forms a layer of substantially anhydrous hydrogen fluoride containing a minor proportion of dissolved dichlorodifluoromethane and a layer of dichlorodifluoromethane containing a small proportion of dissolved HF, separating the layers, and washing the separated dichlorodifluoromethane layer to remove the HF therefrom.

5. The process of separating valuable components from a reaction mixture comprising HCl, HF, $CCl_2F_2$ and $CCl_3F$, of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then settling the remaining mixture until it forms a layer of substantially anhydrous hydrogen fluoride containing a minor proportion of dissolved organic products and a layer of organic products containing a small proportion of dissolved HF, separating the layers, and then subjecting the organic layer to an anhydrous fractional distillation under pressures of from about 0 to about 100 pounds per square inch gauge and at temperatures of from about −36° C. to about +32° C., adjusted to the pressures to distill off the $CCl_2F_2$ and dissolved HF.

6. The process of separating valuable components from a reaction mixture comprising HCl, HF, $CCl_2F_2$ and $CCl_3F$, of the character of that obtained by the reaction of HF on $CCl_4$, which comprises the steps of subjecting the reaction mixture to anhydrous fractional distillation under pressures of about 100 pounds per square inch gauge and at temperatures of from about −50° C. to about −40° C., to distill off the HCl as substantially pure anhydrous hydrogen chloride, then settling the remaining mixture until it forms a layer of substantially anhydrous hydrogen fluoride containing a minor proportion of dissolved organic products and a layer of organic products containing a small proportion of dissolved HF, separating the layers, and then subjecting the organic layer to an anhydrous fractional distillation under pressures of about 40 pounds per square inch gauge and at temperatures of from about 0° C. to about 5° C. to distill off the $CCl_2F_2$ and dissolved HF.

7. The process of separating valuable components from a reaction mixture comprising HCl, HF, $CCl_2F_2$ and $CCl_3F$, of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then settling the remaining mixture until it forms a layer of substantially anhydrous hydrogen fluoride containing a minor proportion of dissolved organic products and a layer of organic products containing a small proportion of dissolved HF, separating the layers, then subjecting the organic layer to an anhydrous fractional distillation under pressures of from about 0 to about 100 pounds per square inch gauge and at temperatures of from about −36° C. to about +32° C., adjusted to the pressures to distill off $CCl_2F_2$ and the dissolved HF as a pseudo azeotrope containing HF in a higher concentration than will dissolve in $CCl_2F_2$, condensing the pseudo azeotrope and settling it until it forms a layer of substantially anhydrous hydrogen fluoride containing a minor proportion of dissolved $CCl_2F_2$ and a layer of $CCl_2F_2$ containing a small proportion of dissolved HF, separating the last mentioned layers, returning the $CCl_2F_2$ layer to the last mentioned fractional distillation, and withdrawing from the last mentioned fractional distillation organic products substantially free of HF.

8. The process of separating valuable components from a reaction mixture comprising HCl, HF and $CCl_2F_2$ of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl as substantially pure anhydrous hydrogen chloride, then settling the remaining mixture until it forms a layer of substantially anhydrous hydrogen fluoride containing a minor proportion of dissolved $CCl_2F_2$ and a layer of $CCl_2F_2$ containing a small proportion of dissolved HF, separating the layers, and then removing the dissolved HF from the $CCl_2F_2$ layer.

9. The process of separating valuable components from a reaction mixture comprising HCl, HF and $CCl_2F_2$ of the character of that obtained by the reaction of HF on $CCl_4$, which comprises the steps of subjecting the reaction mixture to anhydrous fractional distillation under pressures of from about 40 to about 200 pounds per square inch gauge and at temperatures of from about −63° C. to about −20° C., adjusted to the pressures to distill off the HCl at substantially pure anhydrous hydrogen chloride, then settling the remaining mixture until it forms a layer of substantially anhydrous hydrogen fluoride containing a minor proportion of dissolved $CCl_2F_2$ and a layer of $CCl_2F_2$ containing a small proportion of dissolved HF, separating the layers, then subjecting the $CCl_2F_2$ layer to an anhydrous fractional distillation under pressures of from about 0 to about 100 pounds per square inch gauge and at temperatures of from about −36° C. to about +32° C., adjusted to the pressures to distill off $CCl_2F_2$ and the dissolved HF as a pseudo azeotrope containing HF in higher concentration than will dissolve in $CCl_2F_2$, condensing the pseudo azeotrope and settling it until it forms a layer of substantially anhydrous hydrogen fluoride containing a minor proportion of dissolved $CCl_2F_2$ and a layer of $CCl_2F_2$ containing a small proportion of dissolved HF, separating the last mentioned layers, returning the $CCl_2F_2$ layer to the last mentioned fractional distillation, and withdrawing from the last mentioned fractional distillation $CCl_2F_2$ substantially free of HF.

ANTHONY F. BENNING.

No references cited.